United States Patent
Ron et al.

(10) Patent No.: US 9,817,664 B2
(45) Date of Patent: Nov. 14, 2017

(54) REGISTER CACHING TECHNIQUES FOR THREAD SWITCHES

(71) Applicant: Apple Inc., Cupertino, CA (US)

(72) Inventors: Shachar Ron, Mountain View, CA (US); Bernard J. Semeria, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 14/625,956

(22) Filed: Feb. 19, 2015

(65) Prior Publication Data

US 2016/0246728 A1  Aug. 25, 2016

(51) Int. Cl.
*G06F 9/30* (2006.01)

(52) U.S. Cl.
CPC .................. *G06F 9/30098* (2013.01)

(58) Field of Classification Search
None
See application file for complete search history.

(56) References Cited

U.S. PATENT DOCUMENTS

| | | | |
|---|---|---|---|
| 5,974,512 A | 10/1999 | Chiba | |
| 6,408,325 B1 * | 6/2002 | Shaylor | G06F 9/462 712/228 |
| 7,743,233 B2 | 6/2010 | Wang et al. | |
| 8,020,169 B2 | 9/2011 | Yamasaki | |
| 2001/0047468 A1 * | 11/2001 | Parady | G06F 9/3851 712/228 |
| 2004/0003208 A1 * | 1/2004 | Damron | G06F 9/30032 712/225 |
| 2005/0138297 A1 | 6/2005 | Sodani et al. | |
| 2012/0089810 A1 | 4/2012 | Mayer et al. | |
| 2014/0047219 A1 | 2/2014 | Gschwind et al. | |

FOREIGN PATENT DOCUMENTS

EP  0717359  6/1996

* cited by examiner

*Primary Examiner* — Denise Tran
(74) *Attorney, Agent, or Firm* — Meyertons, Hood, Kivlin, Kowert & Goetzel, P.C.

(57) ABSTRACT

Techniques are disclosed relating to register caching techniques for thread switches. In one embodiment, an apparatus includes a register file and caching circuitry. In this embodiment, the register file includes a plurality of registers and the caching circuitry is configured to store information that indicates threads that correspond to data stored in respective ones of the plurality of registers. In this embodiment, the apparatus is configured to store, at a point in time at which a first register of the plurality of registers includes first valid data corresponding to a first thread, second valid data corresponding to a second thread in a second register of the plurality of registers. In some embodiments, the disclosed techniques may reduce context switch latency, reduce pressure on a data cache, and/or allow smaller slices of thread execution, for example.

17 Claims, 6 Drawing Sheets

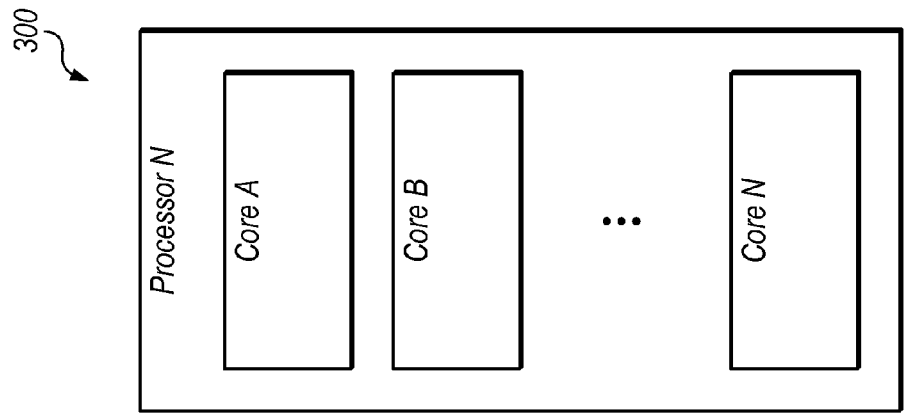
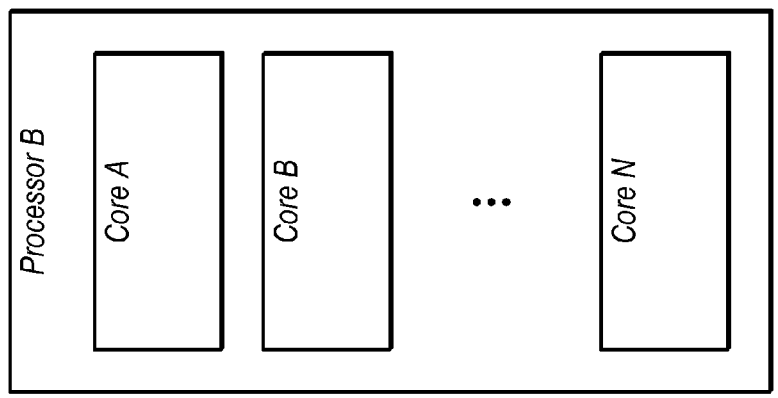
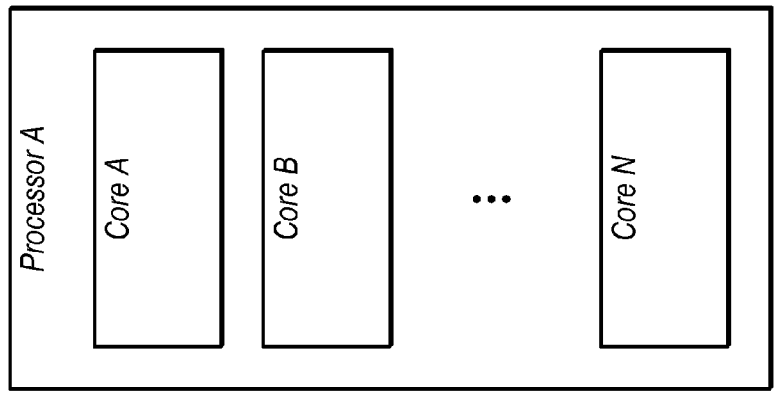
FIG. 3

400

Storing information indicating threads that correspond to data stored in respective ones of a plurality of registers in a register file
410

Storing, at a point in time at which a first register of the plurality of register includes first valid data corresponding to a first thread, second valid data corresponding to a second thread in a second register of the plurality of registers
420

FIG. 4

REGISTER CACHING TECHNIQUES FOR THREAD SWITCHES

BACKGROUND

Technical Field

This disclosure relates generally to computer processing and more specifically to context switching.

Description of the Related Art

Computer programs often include multiple threads that can be independently scheduled. A given processor core typically executes one thread at a time, and switches between threads using time division multiplexing to share processing resources among multiple threads. The state of a current thread or execution context may include processor registers (general purpose registers, vector/floating point registers, and system control registers) as well as the memory contents of a corresponding address space.

When an operating system (OS) or thread scheduler switches between threads, it typically saves all of the registers associated with the thread being switched out to a designated area of memory. It then loads the registers for the thread being switched in from its memory area and resumes execution of the thread. Similarly, when a thread makes a system call (an invocation of an OS function) or an exception or interrupt handler changes the execution context, the thread registers are saved to memory while the OS handles the task and then restored from memory when the calling thread's execution is resumed.

Register files may include a relatively large numbers of physical registers and threads' context may be switched very frequently. Writing data from registers to memory and reading it back consumes significant processing resources.

SUMMARY

Techniques are disclosed relating to register caching techniques for thread switches.

In one embodiment, an apparatus includes a register file and caching circuitry. In this embodiment, the register file includes a plurality of registers and the caching circuitry is configured to store information that indicates threads that correspond to data stored in respective ones of the plurality of registers. In this embodiment, the apparatus is configured to store, at a point in time at which a first register of the plurality of registers includes first valid data corresponding to a first thread, second valid data corresponding to a second thread in a second register of the plurality of registers.

In one embodiment, the apparatus also includes a memory and the apparatus is configured to store data from the register file for the first and second threads in respective first and second backing memory regions in the memory based on context switches between threads. In this embodiment, the caching circuitry is configured to store the second valid data in the second backing memory region in response to an access of the second register by the first thread. In one embodiment, the caching circuitry is configured to restore the second valid data to the second register from the second backing memory region in response to an access of the second register by the second thread. In some embodiments, the caching circuitry is configured to maintain valid, modified, and/or tag fields for registers in the register file.

In one embodiment, a method includes storing information indicating threads that correspond to data stored in respective ones of a plurality of registers and storing, at a point in time at which a first register of the plurality of registers includes first valid data corresponding to a first thread, second valid data corresponding to a second thread in a second register of the plurality of registers.

BRIEF DESCRIPTION OF THE DRAWINGS

FIG. 3 is a block diagram illustrating one embodiment of a multi-processor system.

FIG. 4 is a flow diagram illustrating one embodiment of a method for caching register data.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
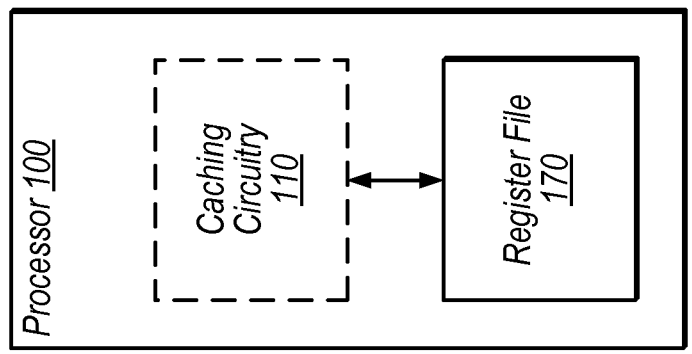
FIG. 1A is a block diagram illustrating an exemplary processor that includes a register file and caching circuitry for the register file.
Figure 1B:
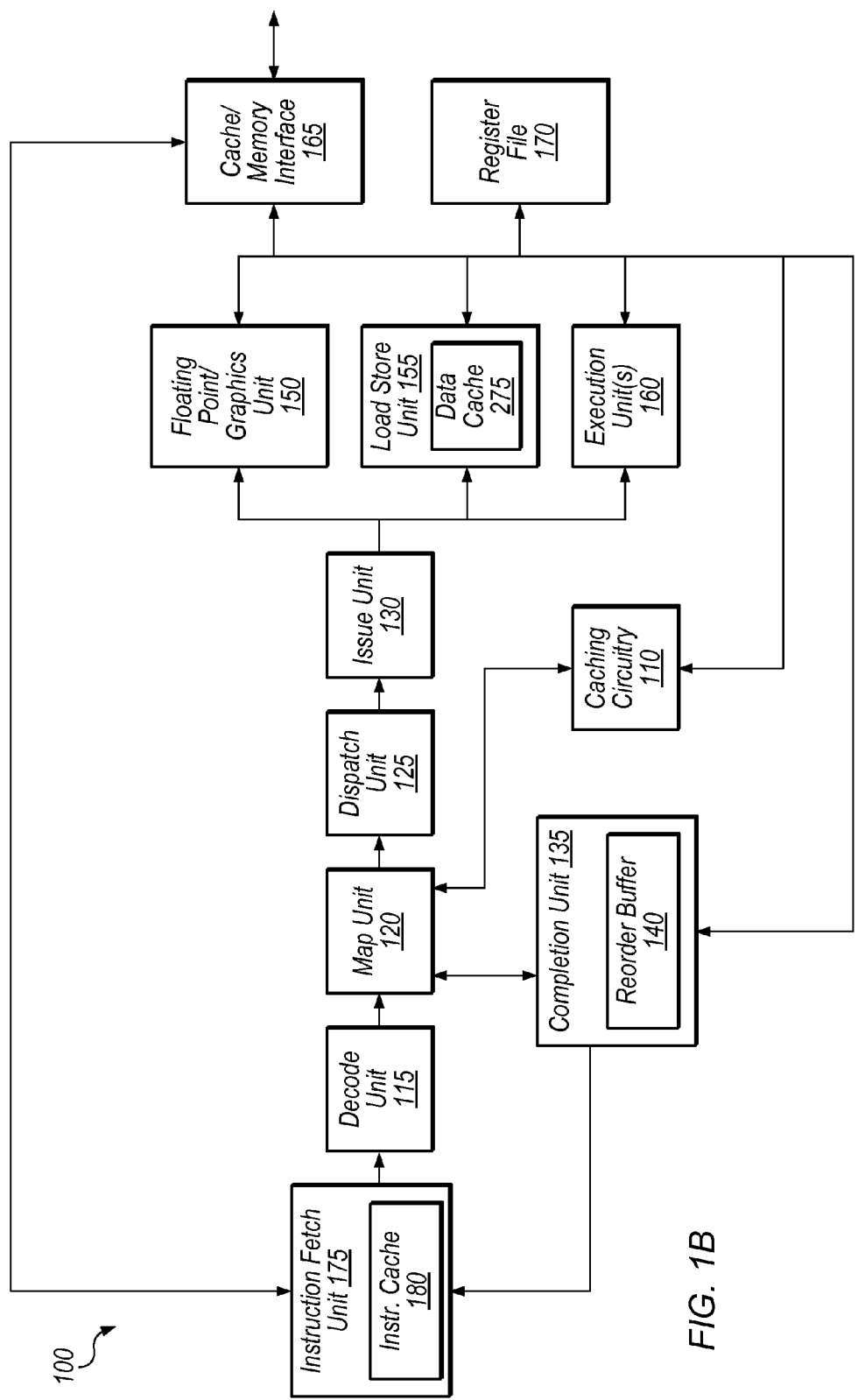
FIG. 1B is a block diagram illustrating one embodiment of a processor pipeline.
Figure 2:
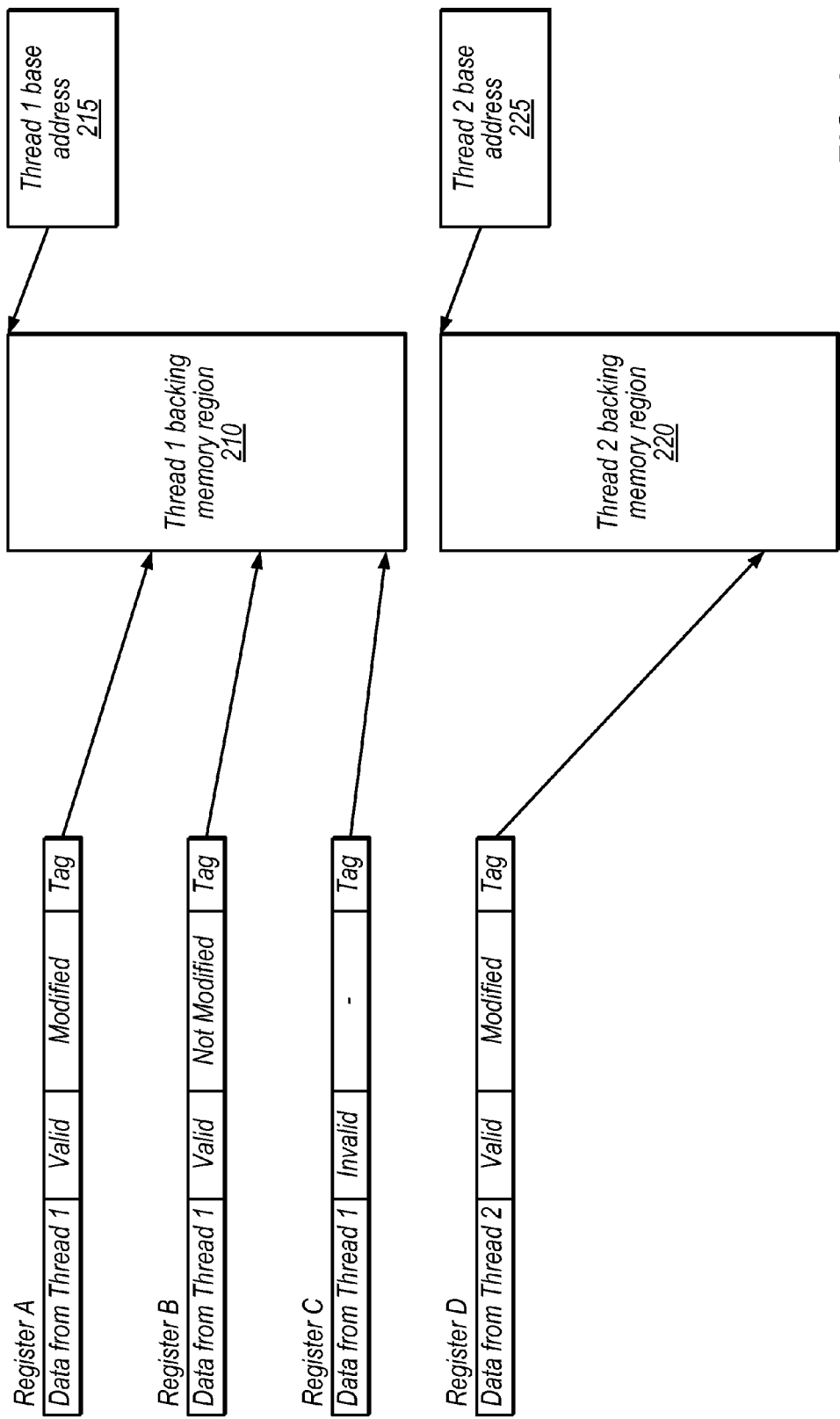
FIG. 2 is a block diagram illustrating exemplary state of registers, caching information, and backing memory regions according to one embodiment.

This disclosure initially describes, with reference to FIG. 1A, an embodiment of a processor that includes a register file and caching circuitry. In some embodiments, the caching circuitry is configured to allow valid register data that was modified by an old thread to remain in the register file after a switch to a new thread, at least until the new thread attempts to use the corresponding register. This may reduce memory accesses for register saves/restores, reduce latency of thread switches, reduce pressure on a data cache, allow smaller slices of thread execution, etc., in some embodiments. FIG. 1B illustrates an exemplary pipeline that includes caching circuitry while FIG. 2 illustrates exemplary register file states. Embodiments of multi-pipeline/core/processor systems, exemplary methods, and an exemplary system are discussed with reference to FIGS. 3-5.

Processor Overview

FIG. 1A shows one embodiment of a processor 100 that includes caching circuitry 110 and a register file 170. In various embodiments, processor 100 is configured to execute program instructions for multiple different threads. In some embodiments, processor 100 is configured to pipeline execution of instructions. An exemplary pipeline is discussed in further detail below with reference to FIG. 1B. Processor 100 may be included in a multi-processor system and/or may include a plurality of processing cores, each of which may include one or more processing pipelines. In some embodiments, processor 100, or a processing element included in processor 100 (e.g., a core), is configured to execute instructions for one thread at a time (or potentially more than one thread if simultaneous multithreading is utilized) and is configured to switch between threads to share execution time between threads. In various embodiments, processor 100 is also configured to perform context switches for system calls by a thread, exception handlers, etc. However, in various embodiments, processor 100 is configured such that an OS does not have to handle saving/restoring registers when switching between threads. In these embodiments, an OS may simply indicate a backing memory region for a given thread and processor 100 may include hardware configured to handle register caching for context switches.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Caching Overview

As discussed above, context switches are typically handled by an operating system (OS) and may involve saving all registers associated with an executing thread to a designated area of system memory then loading, from memory, registers for the thread being switched in. This process requires significant processing resources, especially as the number of registers grows. Thus, in some embodiments, to reduce the amount of data written/read on a context switch, caching circuitry 110 is configured to use register file 170 to cache data from non-executing threads, at least until an executing thread accesses a corresponding register. Speaking generally, in these embodiments, the registers themselves are used as a cache to store data for non-executing thread(s) as long as possible, before backing up data to a backing memory region. In some embodiments, caching circuitry 110 is configured to maintain tag, validity, and modified information for each register in register file 170 (and/or for groups and/or portions of registers in register file 170). In some embodiments, the tag is associated with a backing memory location for a given register. In some embodiments, the tag is usable to determine one or more threads associated with data in a given register (e.g., by determining ones or more threads associated with the backing memory region).

As used herein, the term "thread" is intended to be construed according to its well-understood meaning in the art, including a sequence of program instructions that can be scheduled for execution independently of other threads. Multiple threads may be included in a task or process (which may correspond to a computer program). Threads of a given task may or may not share resources such as registers and memory. Thus, context switches may or may not be performed when switching between threads of the same task. In various embodiments an OS itself may include threads such as kernel threads. In some embodiments, (e.g., using cooperative thread models) threads may schedule themselves without involvement of an OS.

Various embodiments described herein involve an OS performing operations such as context switches. In other embodiments, similar operations may be performed by task schedulers (which are often used in embedded software implementations, for example), thread management software, a user program itself, etc. Therefore, exemplary embodiments that utilize an OS to perform various operations are not intended to limit the scope of the present disclosure.

Register file 170, in various embodiments, includes a number of registers configured to store operands for program instructions. Register file 170 may be implemented using any of various appropriate storage structures. In some embodiments, processor 100 is configured to map physical registers in register file 170 to architectural registers defined by an instruction set architecture (ISA). In some embodiments, different threads executed by processor 100 access the same registers in register file 170, potentially causing data loss if registers are not saved/restored by an OS on thread switches. Therefore, in some embodiments, caching circuitry 110 is configured to detect and resolve such conflicts. Threads may share mappings of architected registers of an ISA to physical registers in register file 170 or separate mappings may be maintained for different threads, in some embodiments.

Caching circuitry 110, in some embodiments, is configured to maintain valid, modified data for a given thread in register file 170 even when the thread is no longer executing (e.g., when another thread has been switched in) and without backing up or storing the data elsewhere. In some embodiments, caching circuitry 110 is configured to store the valid, modified data for the given thread in a backing memory region (e.g., as shown in FIG. 2) in response to the executing thread accessing the corresponding register (but not before determining that the executing thread will access the corresponding register). In these embodiments, the caching circuitry may then retrieve data for the executing thread into the register from another backing memory region. Caching circuitry 110 is shown using dashed lines in the illustrated embodiment to demonstrate that it may be located in one or more of various appropriate elements of processor 100, including within register file 170, for example.

Register File

As used herein, the term "register file" refers to a set of physical registers within a processing element that (a) implement architected registers or that (b) the processing element is configured to map to architected registers. "Architected registers" refer to registers that are defined by an instruction set architecture (ISA) implemented by the processing element. For example, most ARM ISAs define general purpose registers R0-R12 and ARM processors include register files with physical registers that implement R0-R12 (e.g., with a one-to-one correspondence between the architected registers and the physical registers) or are mappable to R0-R12 (e.g., using register renaming).

A physical register "implements" an architected register when there is a one-to-one correspondence between the physical register and the architected register. For example, for such a register, an instruction that specifies a write to the architected register will always result in loading data to the same corresponding physical register that implements the architected register. This is in contrast to architectures in which a processing element is configured to "map" architectural registers specified by operations to different physical registers at different times. This mapping may be performed using register remaining, for example, in which information specifying an architected register as an input operand for an operation may be replaced with information specifying the physical register in which the result of a previous operation that produces the input operand will be stored. Register renaming may facilitate out-of-order execution of program instructions. Exemplary register renaming techniques that may be implemented in some embodiments include the tag-indexed approach and the reservation station approach.

Registers that implement or are mapped to architected registers are written by one or more execution units of the processing element to store data produced by the execution unit(s) in response to operations that specify a destination register. For example, an instruction that specifies loading architected register R1 with data from memory location X results in the data from location X being stored in a physical register in the register file that corresponds to R1 (either because the physical register implements R1 or is mapped to R1). A register load operation for storing data into an architected register is not completed until the data is stored in the corresponding physical register (although the data may later be written to other storage locations such as a backing memory region, etc. after the operation is completed).

The term "execution unit" is intended to be construed according to its well-understood meaning in the art, including circuitry configured to perform operations specified by instructions a computer program. Examples of execution units include integer ALUs, floating-point units, load/store units, etc.

The register file is often (but not always) the lowest level of data storage in a processing element so that data in a register can be accessed relatively quickly in comparison to other storage regions. Thus, data from the system memory hierarchy (which may include system memory and one or more data cache levels) is often loaded in registers in the register file in order to expedite access to the data by execution units.

A "general-purpose" register file refers to a set of physical registers that implement, or are mappable to, architected general-purpose registers. Thus, a general-purpose register file does not include non-general-purpose registers such as registers used to store processor state information, flag registers, etc.

A "SIMD register file" refers to a set of registers that implement, or are mappable to, architected registers used for operands for single-instruction-multiple-data (SIMD) operations.

In view of the preceding discussion, non-limiting examples of storage elements that are not encompassed by the term "register file" include: storage locations in a system memory space such as main memory, various cache levels (e.g., L1, L2, and so on), backup copies of registers, storage locations for saving register contents, and operand caches.

Storage locations in a system memory space and/or in various data cache levels are not included in a register file at least because these locations do not implement architected registers and are not mappable to architected registers. Rather, these locations are typically accessible using their system memory addresses. Typical ISAs provide instructions for moving data from these locations into the register file, at which point the data can be accessed by referencing an architected register. Also, register load operations are complete before data is stored in any of these locations (although these locations may eventually be impacted by data written to a register, e.g., if the data is later stored at those locations after being written to the register).

Backup copies of registers or storage regions outside of system memory for saving register contents are not included in a register file, for similar reasons. Backup copies of registers may be used in some implementations to store data from the register file in response to a context switch, for example. In some implementations, after dumping register data from an old thread into the backup registers, a processor may subsequently proceed to write the data to a backing memory region, if necessary. Backing memory regions for saving register contents are discussed in further detail with reference to FIG. 2. These backup registers/regions are not included in a register file because they do not implement architected registers and are not mappable to architected registers. Note that this is true even though a backup register may store backup data for a register that implements or is mappable to an architected register. This is illustrated by the fact that register load operations are complete before their data is written to the backup register (e.g., because the load operation is complete when the data is written to the actual register before it is backed-up to the backup register).

Operand caches are also not considered to be register files within the context of the present disclosure. Embodiments that include both an operand cache and a register file provide one example in which a register file is not the lowest level of data storage in a processing element. In some embodiments, an operand cache is implemented between a register file and execution unit(s) and used to store operands that have been previously sourced from the register file to the execution unit(s). Subsequent reads of the previously-used operands may be satisfied using data in the operand cache, which may reduce power consumption relative to reading the data from the register file, in some embodiments. Operand cache entries are not, however, part of a register file, at least because they do not implement architected registers and are not mappable to architected registers and because register load operations are completed before data is written to a corresponding operand cache.

Pipeline Overview

Referring now to FIG. 1B, a block diagram illustrating one embodiment of a pipeline of a processor 100 is shown. Processor 100 includes instruction fetch unit (IFU) 175 which includes instruction cache 180. IFU 175 is coupled to an exemplary instruction processing pipeline that begins with decode unit 115 and proceeds in turn through map unit 120, dispatch unit 125, and issue unit 130. Issue unit 130 is coupled to issue instructions to any of a number of instruction execution resources including: execution unit(s) 160, load/store unit (LSU) 155, and/or floating-point/graphics unit (FGU) 150. These instruction execution resources are coupled to register file 170. Additionally, LSU 155 is coupled to cache/memory interface 165. Completion unit 135 is coupled to at least IFU 175, map unit 120, register file 170, and the outputs of any number of instruction execution resources. Caching circuitry 110 may be configured as described above with reference to FIG. 1A and is coupled to map unit 120 and register file 170 in the illustrated embodiment. Caching circuitry 110 may be located in map unit 120, register file 170 and/or other processing elements, but is shown separately to facilitate explanation.

In the following discussion, exemplary embodiments of each of the structures of the illustrated embodiment of processor 100 are described. However, it is noted that the illustrated embodiment is merely one example of how processor 100 may be implemented. Alternative configurations and variations are possible and contemplated.

Instruction fetch unit 175 may be configured to provide instructions to the rest of the pipeline for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated.

In one embodiment, IFU 175 is configured to fetch instructions from instruction cache 180 and buffer them for downstream processing, request data from a cache or memory through cache/memory interface 165 in response to instruction cache misses, and predict the direction and target of control transfer instructions (e.g., branches). In some embodiments, IFU 175 may include a number of data structures in addition to instruction cache 180, such as an instruction translation lookaside buffer (ITLB), instruction buffers, and/or structures configured to store state that is relevant to thread selection and processing (in multi-threaded embodiments of processor 100).

In one embodiment, decode unit 115 is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, decode unit 115 may be configured to decode an ISA instruction into one or more micro-operations, which may also be referred to as "instructions" when they specify an operation to be performed by a processor pipeline. Thus, a particular instruction may or may not be defined by an ISA.

Register renaming may facilitate the elimination of certain dependencies between instructions (e.g., write-after-read or "false" dependencies), which may in turn prevent unnecessary serialization of instruction execution. In one embodiment, map unit 120 is configured to rename the architectural destination registers specified by instructions of a particular ISA by mapping them to a physical register space, resolving false dependencies in the process. In some embodiments, map unit 120 maintains a mapping table that reflects the relationship between architectural registers and the physical registers to which they are mapped. Map unit 120 may also maintain a "free list" of available (i.e. currently unmapped) physical registers. In some embodiments, described in further detail below, map unit 120 may be configured, in conjunction with caching circuitry 110, to stall instructions when a cache miss occurs when accessing a register (e.g., when data in the register corresponds to a different thread than the thread being executed).

Once decoded and renamed, instructions may be ready to be scheduled for performance. In the illustrated embodiment, dispatch unit 125 is configured to schedule (i.e., dispatch) instructions that are ready for performance and send the instructions to issue unit 130. In one embodiment, dispatch unit 125 is configured to maintain a schedule queue that stores a number of decoded and renamed instructions as well as information about the relative age and status of the stored instructions. For example, taking instruction dependency and age information into account, dispatch unit 125 may be configured to pick one or more instructions that are ready for performance.

In one embodiment, dispatch unit 125 includes a load counter and a store counter. In this embodiment, dispatch unit 125 is configured to assign load numbers and store numbers to load and store instructions using ID format 190 as described above with reference to FIG. 1A. Dispatch unit may receive instructions in program order, but instructions may be dispatched and further executed out of program order.

Issue unit 130 may be configured to provide instruction sources and data to the various execution units for picked (i.e. scheduled or dispatched) instructions. In one embodiment, issue unit 130 includes reservation stations for storing instructions while waiting for their operands and/or for other processing resources to become available. In other embodiments, issue unit 130 provides instructions to reservation stations distributed among FGU 150, LSU 155, execution unit(s) 160, etc. In one embodiment, issue unit 130 is configured to read source operands from the appropriate source, which may vary depending upon the state of the pipeline. For example, if a source operand depends on a prior instruction that is still in the execution pipeline, the operand may be bypassed or forwarded directly from the appropriate execution unit result bus. Results may also be sourced from register files representing architectural (i.e., user-visible) as well as non-architectural state. In the illustrated embodiment, processor 100 includes a register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units, and the execution units may or may not be symmetric in functionality.

Load/store unit 155 may be configured to process data memory references, such as integer and floating-point load and store instructions and other types of memory reference instructions. In the illustrated embodiment, LSU 155 includes data cache 275. LSU 155 may be configured to detect misses in data cache 275 and to responsively request data from a cache or memory through cache/memory interface 165. Data cache 275 may be configured as a write-through cache or as a write-back cache. Data cache 275 may include multiple cache indices and ways. In some embodiments, LSU 155 may implement a hardware prefetcher configured to predict and prefetch data that is likely to be used in the future, in order to increase the likelihood that such data will be resident in a data cache when it is needed.

In various embodiments, LSU 155 may implement a variety of structures configured to facilitate memory operations. For example, LSU 155 may implement a data TLB to cache virtual data address translations. LSU 155 may also include hardware configured to support atomic load-store instructions, memory-related exception detection, and read and write access to special-purpose registers (e.g., control registers).

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In the illustrated embodiment, completion unit 135 includes reorder buffer (ROB) 140 and coordinates transfer of speculative results into the architectural state of processor 100. Entries in ROB 140 may be allocated in program order. Completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as completed when their results are allowed to be written to the architectural state. Completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying" or "retrying" as used herein, refers to re-performing a speculatively-performed instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

Exemplary Register States and Caching Situations

FIG. 2 shows exemplary states of four registers A-D, which are included in register file 170 in the illustrated embodiment. In some embodiments, caching circuitry 110 is configured to perform operations for registers A-D similar to operations typically performed for cache lines of an L1 data cache. In the illustrated embodiment, caching circuitry 110 (which may also be referred to as caching logic) includes a valid field, a modified field, and a tag field for each register. In other embodiments, caching circuitry 110 is configured to maintain all or a portion of this information at other granularities, e.g., for groups of multiple registers and/or for portions of registers in register file 170. In some embodiments, caching circuitry 110 may not include all of these fields.

In the illustrated example, register A includes valid, modified data from thread 1 and its tag points to a location in thread 1 backing memory region 210. In the illustrated example, register B includes valid, unmodified data from thread 1 and its tag points to a location in thread 1 backing memory region 210. In the illustrated example, register C includes invalid data from thread 1 and its tag points to a location in thread 1 backing memory region 210. In the illustrated example, register D includes valid, modified data from thread 2 and its tag points to a location in thread 2 backing memory region 210. In some embodiments, registers A-D are configured to store such information while thread 1 has been switched out and thread 2 is executing.

In the illustrated example, each backing memory region is respectively indicated by a base address: thread 1 base address 215 and thread 2 base address 225. In one embodiment, an OS assigns each thread the base address of a backing memory region when the thread is scheduled. In the illustrated example, thread 1 base address 215 specifies the thread 1 backing memory region 210 while thread 2 base address 225 specifies thread 2 backing memory region 220. In various embodiments, the size of each backing memory region is sufficient to store all of the registers in register file 170. In one embodiment, if an OS determines that two or more threads share the same context, the same backing memory region is assigned to each thread. Thus, in this embodiment, the tags for threads that share context may be the same for a given register, allowing those threads to share the register without needing to store data in a backing memory region. Although use of an OS is discussed in various embodiments, other thread schedulers and/or cooperative thread techniques may also be used in other embodiments.

In some embodiments, the backing memory regions may be in system memory. In these embodiments, they may be included in a cache/memory hierarchy for system memory (which may facilitate synchronization of data between processing elements when a thread is executed on different processing elements). In other embodiments, the backing memory regions may be included in a separate memory space. In some embodiments, at least a portion of the backing memory regions may be on-chip to reduce access times. In some embodiments in which the backing memory regions are in a system memory space, register caching operations performed by caching circuitry 110 are configured to bypass data cache 275, and save/restore directly through cache/memory interface 165 without using data cache 275. This may reduce conflicts in data cache 275 and thus improve performance.

For the valid field, in some embodiments, caching circuitry 110 is configured to mark data in a register as invalid in one or more of the following situations: when an instruction writing the data was incorrectly speculatively executed, based on an invalidate instruction, when the register was modified by the same thread executing on another processing element (e.g., another core), based on a last use indication, upon failure to access a backing memory region, at a time when the processing element is transitioning between power states, etc. In some embodiments, data in a register is considered valid until some invalidating event occurs. In various embodiments, if a thread attempts to read from a register that is marked as invalid, caching circuitry 110 is configured to obtain data for the register from the thread's backing memory region rather than using data in the register. As used herein, the term "valid" in the context of data in a register file refers to data that has not been invalidated and which is available to be sent to an execution unit for processing. Thus, if a processor leaves data in a register but the processor is not configured to use the data again without refreshing it (e.g., from a cache or memory) then the data is not valid because it is not available to be sent to an execution unit for processing. Similarly, if the processor has marked the data as invalid, then the data is not valid. In contrast, when data for a thread remains in a register and the thread can access the data directly from the register when the thread is switched back in for execution, the data is considered valid. In some embodiments, caching circuitry 110 does not include a valid field and data in a given register is either always valid, or validity of register data is indicated using other techniques.

For the modified field (which may also be referred to as a "dirty" field), in some embodiments, caching circuitry 110 is configured to mark data in a register as modified when the data has been changed by a thread (after being read from a backing memory region or before being stored in the backing memory region) and the new data has not yet been stored in a backing memory region. In these embodiments, when another thread accesses a register that is valid and modified, caching circuitry 110 is configured to store data in the appropriate backing memory region before allowing the other thread to access the register. But, as noted above, until this occurs, data that is valid and modified may be stored in a register, without writing the data to a backing memory region (at least until another thread accesses the register), even when the thread that modified the data has been switched out. This technique is in contrast to traditional context switches in which all data for a given thread would be written to its backing memory region upon a thread switch. In some embodiments, such full saves/restores (at least of modified data) may be still performed in some situations in conjunction with the disclosed caching techniques, e.g., when a thread is moved to another core or another processor. In situations where the disclosed caching techniques are utilized, however, they may greatly reduce latency in context switches.

For the tag field, in one embodiment, caching circuitry 110 is configured to assign each register an offset, and the offset is added to the base address of the currently executing thread to determine a location in that thread's backing memory region to store data for the register. In one embodiment, the address of this location (or a portion thereof) is used as a tag for the register. In these embodiments, the tag for a given register indicates ones or more threads corresponding to data in the register. In some embodiments, each register access includes a tag (e.g., as determined based on the accessing thread's base address) that is compared to the tag in the register and may be used as a new tag if the thread successfully writes valid data to the register. In some embodiment the tag address is a physical address, although virtual addresses may also be used. In embodiments in which physical addresses are used, the OS may be required to guarantee that all physical pages that include backing memory regions are not repurposed without first writing back to memory the corresponding registers whose tags point to those physical pages, or otherwise invalidating their contents. Using physical mappings may allow writing back data to physical addresses even when those addresses no longer have valid virtual mappings.

The techniques described in detail below for register accesses in different situations may be similar to data caching techniques. The particular caching techniques described herein as performed by caching circuitry 110 are included for exemplary purposes, but are not intended to preclude use of other caching techniques in various embodiments.

Consider a situation, in the illustrated example, in which thread 2 is executing and an instruction in thread 2 accesses register A. The tag for the access (e.g., thread 2 base address 225 plus an offset for register A) will not match the tag for register A (e.g., thread 1 base address 215 plus an offset for register A). In response to the mismatch, caching circuitry 110 is configured to stall the access for thread 2 in one embodiment. Caching circuitry 110 is then configured to store the data in register A at the location in backing memory region 210, based on the tag for register A. The access by thread 2 is then allowed to proceed. If the access involves storing data in register A, then the data from thread 2 is written to register A once the data from thread 1 has been stored to memory.

Alternately, if the thread 2 access involves a read from register A, caching circuitry 110 is configured to read the data from backing memory region 220 from the location indicated by the tag provided with the access and store the retrieved data in register A, at which point the access of register A is allowed to proceed, in one embodiment. Note that a given instruction may access multiple registers (e.g., an add operation may have input operands from registers A and B and write an output operand to register C). Thus, caching circuitry 110 may be configured to handle data for multiple registers for a single instruction.

In some embodiments, thread stalls for tag mismatches may be handled by mapping unit 120. In one embodiment, mapping unit 120 is configured to create a dependency for an access with a mismatching tag, such that the access is dependent on one or both of (1) an operation to retrieve the correct value for the relevant register and (2) an operation to store the old data in the register to a backing memory region for another thread. Mapping unit 120 may be configured to allow the access to proceed when one or both of these operations is completed, depending on the situation. For example, if thread 2 accesses register A in the illustrated example, mapping unit 120 may create a dependency for the access on an operation to save the valid, modified data from thread 1 to backing memory region 210 and a dependency on an operation to retrieve the correct value for register A for thread 2 from backing memory region 220. Mapping unit 120 may then allow the access by thread 2 to register A to proceed when both these operations on which it depends have completed. Thus, in various embodiments described herein, register saves/restores are performed asynchronously, when a processor actually uses a given register, rather than being performed on a context switch. In some embodiments, these load/store operations may be masked using a processor's speculative execution and/or pipelining techniques. Thus, the latency of a thread switch may be deferred or even hidden or avoided in these embodiments.

When a thread accesses a register that is storing data for the thread, the provided tag and the register tag will match and the instruction is allowed to access the register directly, without stalling. This is the case when thread 1 accesses register A, in the illustrated example. If the access changes the contents of the register and the register was not previously modified, caching circuitry 110 may set the modified field for the register. Note that thread 1, for example, may access register A again after multiple context switches, such that execution of other threads (and/or system calls, exception handlers, etc.) occurs between accesses. In the case that the intervening threads do not access register A, the tag for an access from thread 1 will remain a match and data from register A may not be written to backing memory region 210 between the accesses, even though execution of other threads intervened. This may greatly reduce memory accesses required when switching threads, because only registers used by thread 1 that are used by intervening threads must be saved and/or restored. This may in turn allow smaller slices of thread execution (i.e., a great number of thread switches over a given execution period) which may improve OS efficiency. Efficiency may be greatly increased, for example, for threads that largely do not access the same registers. In some embodiments, register renaming techniques may be used to reduce conflicts between threads for physical registers, at least in embodiments in which threads use different mappings between architected and physical registers. For example, different physical registers may be mapped for different threads that use different mappings, to the extent possible, to avoid conflicts between those threads.

Consider a situation, in the illustrated example in which thread 2 accesses register B, which includes valid data for thread 1 that has not been modified. In this case, the data from thread 1 does not need to be stored in backing memory region 210 (e.g., because it is already present and has not been modified), and thread 2 can access register B immediately for a write or after retrieving the corresponding data from backing memory region 220 for a read. Caching circuitry 110 may operate similarly when a thread accesses a register that holds invalid data (e.g., register C), which does not need to be backed up.

In some embodiments, the disclosed techniques may be utilized for one set or type of registers in a register file and not another. For example, the techniques disclosed herein may be applied for SIMD registers, but not general purpose registers or vice versa. Similarly, different types of registers or portions of a register file may utilize different backing memory regions for the same thread. For example, one backing memory region may be used for SIMD registers and a different backing memory region used for general purpose registers. In some embodiments, the register file is not restricted to architecturally-defined registers are may include renamed registers that are configurable to be mapped to architecturally-defined registers, for example In some embodiments, processor 100 is configured to execute clean and invalidate instructions for register file 170.

In one embodiment, a clean instruction may be used to write modified register contents to a backing memory region. In some embodiments, the clean instruction may have an address parameter to indicate a particular register or set of registers. In some embodiments, the clean instruction may be performed for all registers that have tags matching locations in a backing memory region for a particular thread.

In one embodiment, an invalidate instruction may be used to invalidate or discard register contents. Similarly to a clean instruction, in some embodiments the invalidate instruction may have an address parameter or may be performed for all registers corresponding to a given thread or set of threads (e.g., based on tags of the registers). In some embodiments, even dirty/modified registers may be invalidated. In some embodiments, an invalidate instruction may include a parameter to specify whether the invalidation is broadcast to other processing elements. Further embodiments relating to systems with multiple processing elements are discussed below with reference to FIG. 3.

In some embodiments, caching circuitry 110 is configured to perform various maintenance operations. For example when a thread is terminated or otherwise no longer has a valid context, caching circuitry 110 may invalidate all register with tags that are based on the base address value for that thread. These invalidations may or may not be broadcast to other processing elements. For example, in some embodiments, a non-broadcasting invalidate operation may be used to destroy the context of an interrupt handler (which will not have entries on other processing elements).

FIG. 3 is a block diagram illustrating one embodiment of a multi-processor system 300. In the illustrated embodiment, system 300 includes a number of processors A-N, which each include a number of cores A-N. The various elements of system 300 may be communicatively coupled. In some embodiments, each core includes its own register file 170. Any of various numbers of processors and/or cores may be utilized in various embodiments. In some embodiments, system 300 is configured to migrate threads from one core to another core (which may be located on the same processor or a different processor). In other embodiments, threads may be migrated among various processing elements at various different granularities.

Using the above techniques for caching register data, problems could occur if a thread was migrated from an old processing element to a new processing element, but modified data for the thread was maintained in the old processing element's register file that had not been written to a memory accessible to both the old and the new processing elements. Therefore, in one embodiment, cores are configured to broadcast and/or snoop register file accesses. Thus, if core A (new processing element for thread A) writes to register A for thread A, core B (old processing element for thread A) may invalidate register A or use the data from core A to update register A. Further, if thread A does not modify register B while executing on core A, thread A may subsequently use valid, modified data stored in core B's register file if thread A is migrated back to core B (without any snoop, invalidate, and/or update for register B). Speaking broadly, in these embodiments, one processing element may include data in a register file that is valid and/or modified for a thread that is executing on another processing element.

In some embodiments, when a thread is migrated to another core or another processor, the register file entries for the thread are cleaned when the thread is switched out. This may reduce costs of snooping and broadcasting, but may reduce advantages of the disclosed caching techniques. Even in these embodiments, however, the disclosed caching techniques may still be useful in the frequent cases of interrupts, system calls, and virtual machine (VM) faults, for example.

Various techniques disclosed herein for switches between threads may also be used for system calls, interrupt handlers, exceptions, etc. The illustrated examples discuss thread switches for convenience but are not intended to limit the context switching scenarios in which various techniques may be implemented.

Exemplary Method

Referring now to FIG. 4, a flow diagram illustrating one exemplary embodiment of a method 400 for caching register data is shown. The method shown in FIG. 4 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 410.

At block 410, in the illustrated embodiment, information is stored that indicates threads that correspond to data stored in respective ones of a plurality of registers in a register file. For example, for a first thread, a corresponding first register may include data modified for the first thread or that was retrieved into the first register based on execution of an instruction of the first thread. In some embodiments, the information is a tag that is determined based on a backing memory region associated with the one or more threads. Flow proceeds to block 420.

At block 420, in the illustrated embodiment, at a point in time at which a first register of the plurality of registers includes valid data corresponding to a first thread, second valid data corresponding to a second thread is stored in a second register of the plurality of registers. In some embodiments, the valid data corresponding to the first thread is marked as modified by the first thread and the valid data corresponding to the second thread is marked as modified by the second thread. In various embodiments, caching circuitry 110 is configured to handle accesses by the first and second thread based on the stored information (e.g., by allowing a thread to access corresponding data, storing data for inactive threads in a backing memory in response to an access by another thread, retrieving data for a thread from the backing memory, etc.). Flow ends at block 420.

Potential Processor Implementations

In some processor implementations, all modified/dirty registers are written to a backing memory region on each thread/context switch. This may avoid issues with area and power consumption (because only modified/dirty registers are written, rather than all registers), but requires a large number of reads/writes on context switches, which may be avoided in disclosed embodiments in which modified registers are not saved in a backing memory region until another thread needs to access the register.

To avoid some of the context switch latency, in some implementations, a backup register file may include backup registers for a register file. In these embodiments, in response to a given thread being switched out, all data (or all modified data) in the register file for a given thread may be copied to the backup registers, and caching circuitry 110 may subsequently handle saving this data to a backing memory region (e.g., based on whether particular registers are modified/dirty). This implementation does not require identification of which thread modified data in a given register (e.g., using a tag), because valid, modified data for different threads is not present at the same time in the register file. However, this implementation may require additional area (for the backup registers) and consume substantial additional power, especially as the number of registers grows.

In still other implementations, a separate set of registers is maintained for each thread (e.g., up to a maximum number of threads executable by processor 100) rather than sharing a register file among threads. However, these embodiments may also significantly increase area and power consumption relative to the embodiments discussed in detail above. In contrast, in various embodiments discussed above, registers in register file 170 are accessible to all threads executing on a corresponding processing element, rather than having different sets of registers dedicated to different threads.

Exemplary Device

Figure 5:
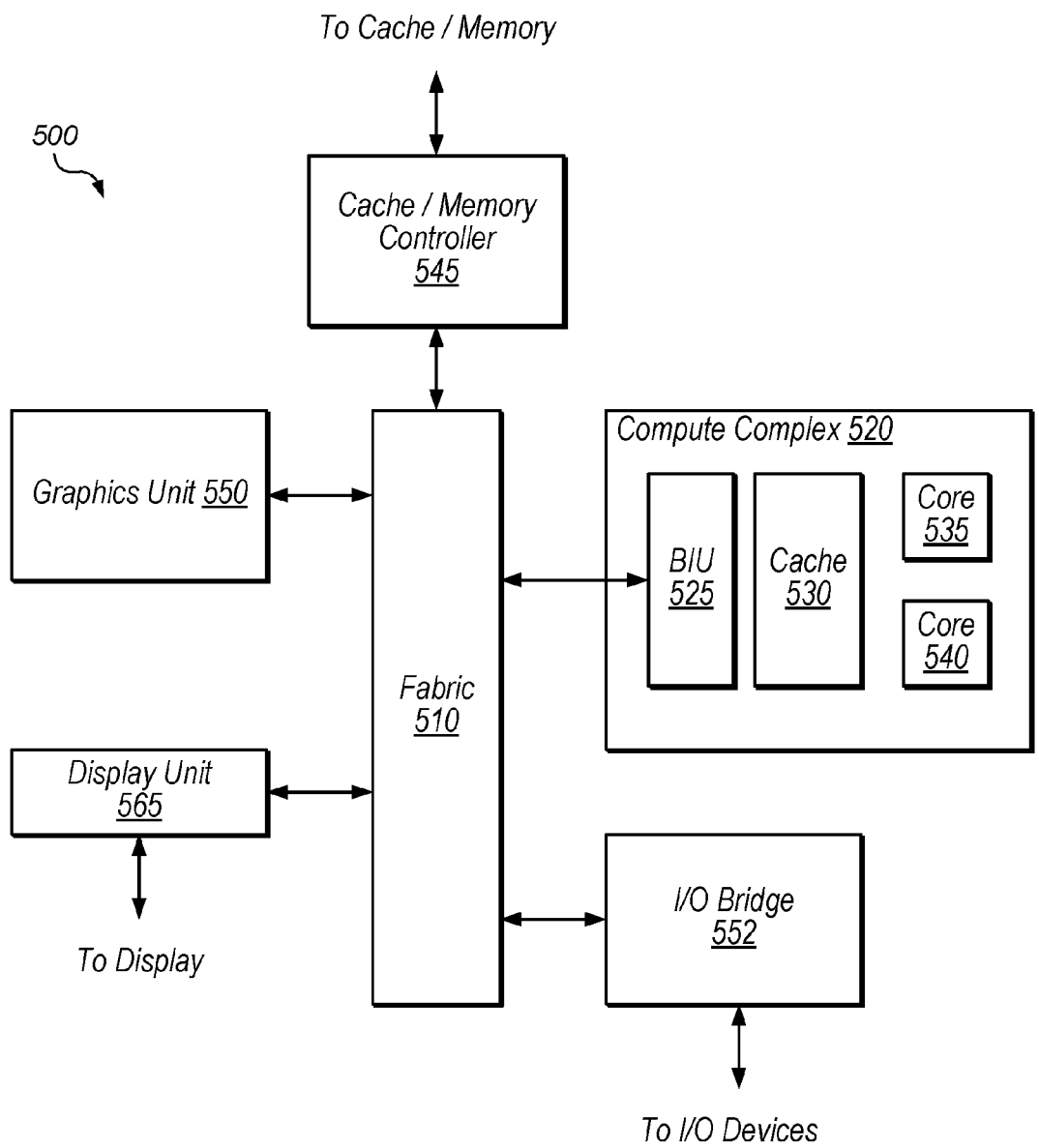
FIG. 5 is a block diagram illustrating one embodiment of a device that includes one or more processors.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 552, cache/memory controller 545, graphics unit 550, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. Compute complex 520 may correspond to processor 100 in some embodiments. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 550 may be described as "coupled to" a memory through fabric 510 and cache/memory controller 545. In contrast, in the illustrated embodiment of FIG. 5, graphics unit 550 is "directly coupled" to fabric 510 because there are no intervening elements.

Graphics unit 550 may include one or more processors and/or one or more graphics processing units (GPU's). Graphics unit 550 may receive graphics-oriented instructions, such as OPENGL®, Metal, or DIRECT3D® instructions, for example. Graphics unit 550 may execute specialized GPU instructions or perform other operations based on the received graphics-oriented instructions. Graphics unit 550 may generally be configured to process large blocks of data in parallel and may build images in a frame buffer for output to a display. Graphics unit 550 may include transform, lighting, triangle, and/or rendering engines in one or more graphics processing pipelines. Graphics unit 550 may output pixel information for display images.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 552 may include various elements configured to implement: universal serial bus (USB) communications, security, audio, and/or low-power always-on functionality, for example. I/O bridge 552 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 552.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first register file comprising a plurality of registers;
   caching circuitry configured to store information that indicates threads that correspond to data stored in registers of the plurality of registers; and
   a memory, wherein the apparatus is configured to use first and second backing memory regions in the memory for respective first and second threads;
   wherein the apparatus is configured to store, at a point in time at which a first register of the plurality of registers includes first valid data corresponding to a first thread, second valid data corresponding to a second thread in a second register of the plurality of registers; and
   wherein the apparatus is configured to, based on information stored in the caching circuitry, store the second valid data in the second backing memory region in response to an access of the second register by the first thread; and
   wherein the apparatus is configured to:
   migrate the first thread from a first processor core that includes the first register file for execution on a second, different processor core that includes a second register file;
   maintain the first valid data in the first register while executing at least a portion of the first thread on the second processor core; and
   access the first valid data in the first register file after migrating the first thread back to the first processor core.

2. The apparatus of claim 1, wherein the caching circuitry is configured to restore the second valid data to the second register from the second backing memory region in response to an access of the second register by the second thread.

3. The apparatus of claim 1, wherein, at the point in time, the apparatus is configured to store information specifying that the first valid data is not currently stored in the first backing memory region and that the second valid data is not currently stored in the second backing memory region.

4. The apparatus of claim 1,
   wherein the caching circuitry is configured to store tag information for the second valid data when the second valid data is in the second register, wherein the tag information corresponds to a location in the second backing memory region for the second register; and
   wherein the caching circuitry is configured to store the second valid data in the location in the second backing memory region in response to the access of the second register by the first thread, wherein the access by the first thread uses a tag that does not match the tag information.

5. The apparatus of claim 1, wherein the memory comprises an on-chip memory.

6. The apparatus of claim 1, further comprising:
   a data cache configured to cache data for the first register file, wherein the first and second backing memory regions are accessible to the caching circuitry without using the data cache.

7. The apparatus of claim 1, wherein the apparatus is configured to execute instructions of the first thread and not instructions of the second thread during a time interval that includes the point in time.

8. The apparatus of claim 1, wherein the caching circuitry includes a valid field, a modified field, and a tag field for one or more registers of the plurality of registers.

9. The apparatus of claim 1, further comprising:
   a plurality of different processing elements configured to separately execute threads using a plurality of respective register files;
   wherein a first one of the plurality of different processing elements that includes the first register file is configured, in response to a write of particular data to a register corresponding to the second register in a different register file of the plurality of respective register files by a second one of the plurality of different processing elements, to write the particular data to the second register or to invalidate the second valid data in the second register.

10. The apparatus of claim 1, wherein the second valid data is modified data.

11. The apparatus of claim 1, wherein the apparatus is configured to retrieve the second valid data from the backing memory region in response to an access of the second register by the second thread, subsequent to the apparatus storing the second valid data.

12. A method, comprising:
    storing, by caching circuitry, in an computing system that includes a first register file that comprises a plurality of registers, storing information indicating threads that correspond to data stored in respective ones of the plurality of registers; and storing, by the computing system storing, at a point in time at which a first register of the plurality of registers includes first valid data corresponding to a first thread, second valid data corresponding to a second thread in a second register of the plurality of registers; and storing, in response to an access of the second register by the first thread and based on information stored in the caching circuitry, the second valid data in a backing region in a memory for the second thread;

migrating the first thread from a first processor core that includes the first register file for execution on a second, different processor core that includes a second register file;

maintaining the first valid data in the first register while executing at least a portion of the first thread on the second processor core; and accessing the first valid data in the first register file after migrating the first thread back to the first processor core.

13. The method of claim 12, further comprising:
refraining from storing the second valid data in the backing memory region at least until an instruction from a thread other than the second thread is determined to access the second register.

14. The method of claim 12, further comprising:
restoring the second valid data to the second register in response to an access of the second register by the second thread.

15. The method of claim 12, wherein the storing the second valid data in the backing memory region comprises storing without using a low-level data cache.

16. The method of claim 12, further comprising:
maintaining validity information, modified information, and tag information for the first register file.

17. An apparatus, comprising:
a first register file comprising a plurality of registers;
caching circuitry configured to store information that indicates threads that correspond to data stored in registers of the plurality of registers, wherein the caching circuitry includes a valid field, a modified field, and a tag field for one or more registers of the plurality of registers;

wherein the apparatus is configured to store, at a point in time at which a first register of the plurality of registers includes first valid data corresponding to a first thread, second valid data corresponding to a second thread in a second register of the plurality of registers;

wherein the apparatus is configured to store, in response to an access of the second register by the first thread and based on information stored in the caching circuitry, the second valid data in a backing region in a memory for the second thread; and wherein the apparatus is configured to:
migrate the first thread from a first processor core that includes the first register file for execution on a second, different processor core that includes a second register file;

maintain the first valid data in the first register while executing at least a portion of the first thread on the second processor core; and access the first valid data in the first register file after migrating the first thread back to the first processor core.

* * * * *

UNITED STATES PATENT AND TRADEMARK OFFICE
CERTIFICATE OF CORRECTION

PATENT NO. : 9,817,664 B2                               Page 1 of 1
APPLICATION NO. : 14/625956
DATED : November 14, 2017
INVENTOR(S) : Shachar Ron et al.

It is certified that error appears in the above-identified patent and that said Letters Patent is hereby corrected as shown below:

In the Claims

Claim 12, Column 18, Line 65, please delete "storing information" and substitute --information--.

Claim 12, Column 19, Line 1, please delete "computing system storing" and substitute --computing system--.

Signed and Sealed this
Third Day of July, 2018

Andrei Iancu
*Director of the United States Patent and Trademark Office*